June 5, 1951                G. S. CARRICK                2,555,674
                      ELECTRIC MOTOR CONTROL SYSTEM
Filed May 10, 1945                                    4 Sheets-Sheet 1

INVENTOR
G. S. Carrick
BY
Jarvis C. Mable
ATTORNEY

June 5, 1951 G. S. CARRICK 2,555,674
ELECTRIC MOTOR CONTROL SYSTEM
Filed May 10, 1945 4 Sheets-Sheet 2

INVENTOR
Gerald S. Carrick
BY
ATTORNEY

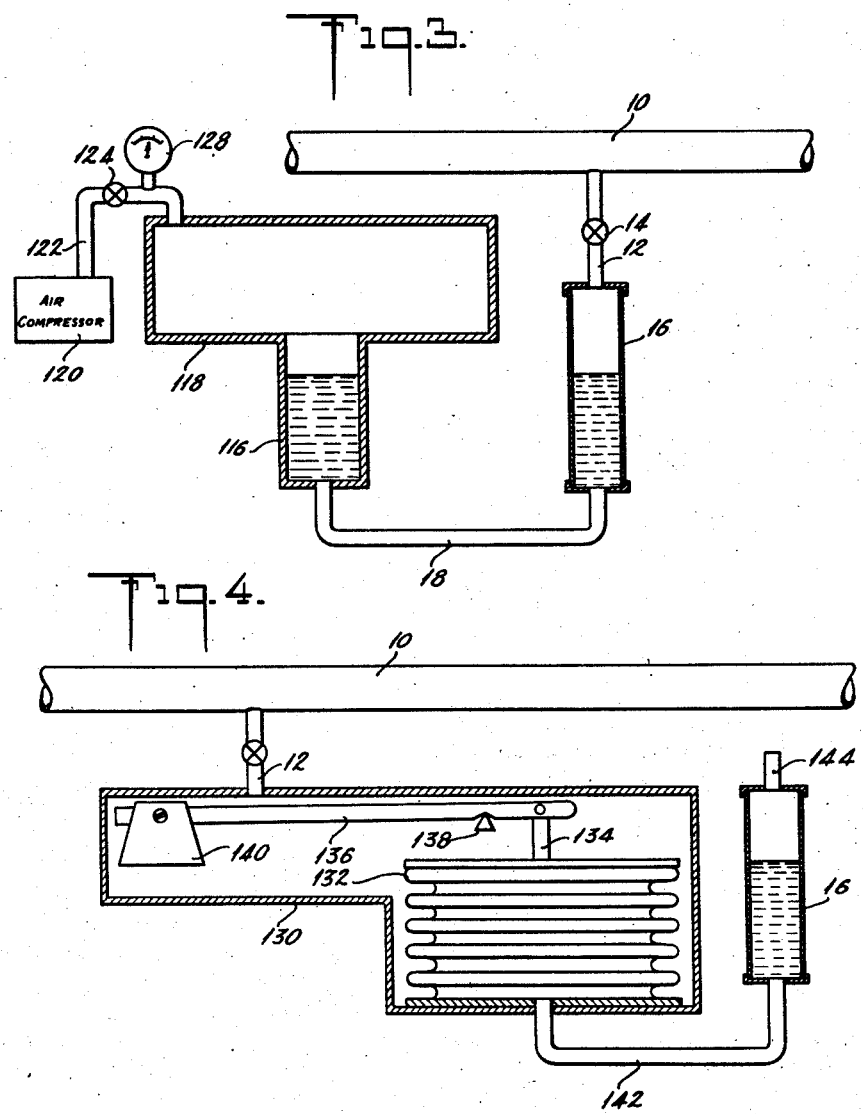

June 5, 1951 G. S. CARRICK 2,555,674
ELECTRIC MOTOR CONTROL SYSTEM
Filed May 10, 1945 4 Sheets-Sheet 4

INVENTOR.
Gerald S. Carrick
BY
his ATTORNEY

Patented June 5, 1951

2,555,674

UNITED STATES PATENT OFFICE 2,555,674

ELECTRIC MOTOR CONTROL SYSTEM

Gerald S. Carrick, Pleasantville, N. Y.

Application May 10, 1945, Serial No. 593,073

2 Claims. (Cl. 318—31)

My invention relates to pressure responsive apparatus, and more particularly to pressure responsive regulators, and especially those employing a column of liquid, such as mercury, to balance or partially balance the pressure, the variations of which are employed to provide the desired regulation.

Heretofore, regulators of this type have employed a float responsive to variation in the level of a mercury column in a manometer. However, in such an apparatus the float is apt to stick, thus resulting in improper regulation. In addition the float must be placed in the atmospheric leg of the manometer in order that the motion thereof may be transmitted to outside the manometer without requiring stuffing boxes or the like, which means that it must be located at a relatively high elevation in the plant. Moreover, inasmuch as it requires approximately two inches of mercury column to balance 1 lb. of pressure, the atmospheric leg must be unreasonably long if the pressure is high, as is the case in modern steam plants employing steam pressure up to and above 2,000 lbs. per square inch, which would require an atmospheric leg approximately 333 feet in height.

In accordance with my invention, I employ electric switching means located adjacent to and outside either leg of a manometer, the switching means being responsive to the transmission of energy through the wall of the tube, together with means for varying such transmission of energy in response to variations in the height of the liquid column in the leg. Inasmuch as no moving parts pass through or into the manometer tube, the electric switching means may be controlled by the level of the mercury or other liquid in the pressure leg of the manometer. Consequently, even if the entire steam or other pressure is balanced by a mercury column, the regulating apparatus may be located, if desired, at a relatively low level in the plant. Moreover, it is possible to use various novel means for balancing a portion of the pressure, thereby making unnecessary an extremely long atmospheric leg.

My invention also includes novel follow-up mechanism for preventing over-regulation.

In one embodiment of my invention the switching means comprises a pair of vertically spaced photo-electric cells on one side of a transparent manometer tube. Suitable light sources are arranged to direct beams of light through the tube to the cells, variations in liquid level thus serving to make and break the beams, which in turn causes completion and interruption of electric circuits through the cells. The cells and preferably also the light sources are arranged to be moved vertically in response to activation of the cells so as to follow the changes in liquid level, in order to prevent over-regulation and hunting.

In accordance with another embodiment of my invention, magnetically responsive electric switches are spaced vertically beside a manometer tube. A magnet is arranged to float at the surface of the liquid in the tube and hence moves up and down with variations in liquid level so as to alter the magnetic force or flux which passes through the wall of the tube to the respective switches. As in the first embodiment mentioned, the switches are mounted so as to be moved vertically in response to the completion and interruption of the circuits therethrough so as to follow variations in liquid level and thus prevent over-regulation.

Further objects and advantages of my invention will be apparent from the following description, considered in connection with the accompanying drawings which form a part of the specification and of which:

Fig. 3 is a more or less diagrammatic view of my invention in a system in which the pressure is balanced in part by a body of trapped gas;

Fig. 4 is a more or less diagrammatic view of my invention in which the pressure is balanced in part by a loaded bellows.

Figure 1:
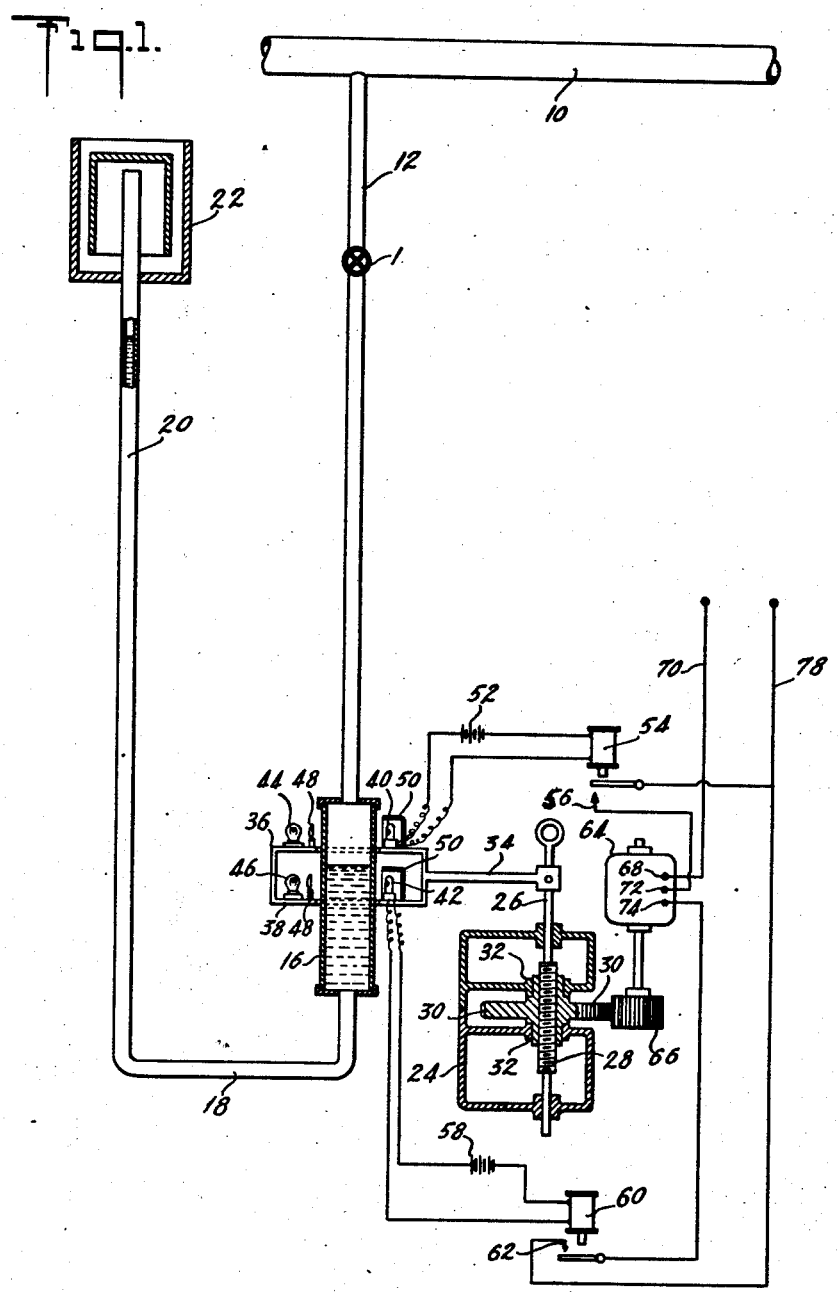
Fig. 1 is a more or less diagrammatic view of an embodiment of my invention employing photoelectric cells and in which the pressure is balanced solely by a column of mercury or other suitable liquid.

Referring more particularly to Fig. 1, reference character 10 designates a conduit such as the steam header in a power plant, which carries fluid under pressure, the variations in which pressure are to be utilized for regulating purposes, for instance for regulating the rate of steam generation as by controlling the draft, the rate of fuel feed, or other factors, as is well known in power plant operation. Connected to the header 10 is a conduit 12, in which is preferably interposed a shut-off valve 14, and which leads to the upper end of a transparent, preferably cylindrical container 16, which in all respects may be similar to a gauge glass and will be referred to as such hereinafter. The conduit 18 communicates with the lower end of glass 16 and is U-shaped, having an upwardly extending portion 20. It will thus be seen that the gauge glass 16, together with the portion of the conduit 18 extending downwardly therefrom constitutes the pressure leg of a manometer while the portion 20 of the conduit constitutes the atmospheric leg. The leg 20 must have sufficient vertical extent so that the difference between the head of liquid contained in it and in the pressure leg of the manometer is able to balance the pressure in the header 10. Inasmuch as mercury is the heaviest substance which is liquid at normal temperature, it is preferably employed in the manometer. Also, mercury is opaque, which is desirable, as will hereinafter appear. However, it is within the scope of my invention to employ other liquids, such as water, particularly if the pressure is low. A mercury trap 22 of any well-known construction may be provided at the upper open end of the atmospheric leg 20 in order to catch mercury which would be blown out as the result of an abnormal increase in the pressure in line 10, or as a result of insufficient mercury in the manometer which would cause a blow-through.

Suitably mounted adjacent to the gauge glass 16 is a housing 24 within which is reciprocally mounted a rod 26. This rod preferably has a square or other non-circular cross-section so as to prevent rotation thereof in the housing. A portion of the rod is formed with an external screw thread 28 which engages a similar internal thread formed in the gear 30. This gear is rotatably mounted in the housing 24, by means of combined radial and thrust bearings 32. The rod 26 has rigidly attached thereto an arm 34 which is forked so as to provide an upper arm 36 and a lower arm 38. Both of these arms have arcuate portions which extend around the outside of the gauge glass 16 so that one end of the arcuate portion of each arm is diametrically opposite the other end with respect to the glass. A photo-electric cell 40 is suitably mounted on one end of the upper arm 36, while a similar cell 42 is mounted on the corresponding end of the lower arm 38. The opposite ends of these arms carry light sources 44 and 46, respectively, each of which may be provided with a suitable lense system as is diagrammatically indicated at 48, which serves to concentrate beams of light from the light sources, and to direct the beams through the gauge glass 16 towards the respective photo-electric cells. Each of the latter is preferably provided with a hood or the like 50, which serves to protect it from extraneous light, including light from the wrong light source. In other words, the cell 42 should not receive light from the source 44, nor from any other place than the source 46.

Photo-electric cell 40 is connected in series through suitable flexible leads to a battery 52 and the solenoid 54 of a relay having a normally closed contact 56. Photo-electric cell 42 is similarly connected through suitable flexible leads with the battery 58 and the solenoid of a relay having a normally open contact 62. Obviously, both of the relay circuits could be connected in parallel to the same battery, or to any other suitable source of electric energy.

A reversible electric motor 64 carries a pinion 66 which meshes with the gear 30. This motor is provided with three terminals, of which terminal 68 is connected to the wire 70 of any suitable power circuit, while the terminals 72 and 74 are connected to the other wire 78 of the circuit through the contacts 56 and 62, respectively.

As is well known, the internal connections of the motor are such that it will rotate in one direction when supplied with current through the terminals 68 and 72, and will run in the opposite direction when supplied with current through the terminals 68 and 74. The above described device operates as follows:

Assuming the valve 14 to be open, pressure existing in the header 10 will be exerted through the conduit 12 on the upper surface of the mercury, or other liquid, contained within the gauge glass 16 and will depress the level of the mercury therein, at the same time raising it in the atmospheric leg 20 until the difference in heads of the two mercury columns balances the pressure. The amount of mercury placed in the manometer is so chosen that the lever thereof in the pressure leg will stand at about the middle of the gauge glass when the pressure in the header 10 is normal, as is shown in Fig. 1. With the parts in the position shown in this figure, the beam of light from the source 44 will pass through the transparent gauge glass 16 above the level of the mercury therein and will strike the photo-electric cell 40. The nature of this cell is such that, when subjected to light, it closes the electric circuit therethrough, thus energizing the solenoid 54 and maintaining the contact 56 open. On the other end, the light from the source 46 is interrupted by the mercury in the gauge glass and consequently no light strikes the photo-electric cell 42 and hence the solenoid 60 is not energized. As a result the contact 62 is open and the motor 64 is idle. Should the pressure in the header 10 increase, it will depress the level of the liquid in the gauge glass 16 until the level is below the beam of light from the source 46 and, hence, this beam will strike the cell 42, thus energizing the solenoid 60 and closing the contact 62. This connects the motor 64 to the power supply through the terminals 68 and 74, which causes the motor to rotate in the proper direction so as to move the rod 26 downwardly at a speed which is preferably greater than the speed at which the mercury level is depressed as a result of normal fluctuations of pressure.

Inasmuch as the light sources and the photo-electric cells are carried by the rod 26, they will move downwardly with it and the beam from the source 46 will be interrupted by the mercury in the gauge glass, thus opening the contact 62 and stopping the motor. If the device is employed as a regulator, the downward movement of rod 26, through suitable transmission means, has effected an adjustment of some member which tends to decrease the pressure in the line 10. If the regulation resulting from this downward movement of the rod 26 has been sufficient to arrest the increase in pressure, the level in the gauge glass does not decrease further and no further regulation takes place. However, if the pressure continues to increase, as soon as the mercury level falls below the beam from the source 46, contact 62 is again closed and the motor operates to further lower the rod 26 and hence to produce further regulation for decreasing the pressure. This step-by-step regulation continues until the increase in pressure is arrested. The advantage of the step-by-step movement is that it prevents over-regulation and hence hunting of the device.

In the event the pressure in the line 10 decreases, the mercury level in the gauge glass rises so as to interrupt the beam of light from the source 44, which in turn opens the circuit of the solenoid 54, thus permitting the contact 56 to close. Consequently, the motor 64 is connected through its terminals 68 and 72 and thus runs in the opposite direction from that previously described, so as to raise the rod 26. This in turn raises the light sources and the photo-electric cells until the beam from the source 44 strikes the cell 40, thus opening the contact 56 and stopping the motor. If necessary, this action is repeated, in the same manner as described in connection with the increase in pressure.

It will be noted that, due to the fact that no moving parts extend through the pressure leg of the manometer the regulating apparatus may be located in the neighborhood of the liquid level in this leg, which is always lower than the level in the atmospheric leg. Hence the apparatus may be placed at a low elevation even if a relatively long atmospheric leg is required in order to balance the pressure. As a matter of fact, the atmospheric leg can be extended through the roof of the plant and up alongside the stack in order to enable it to balance very high steam pressures.

Figure 2:
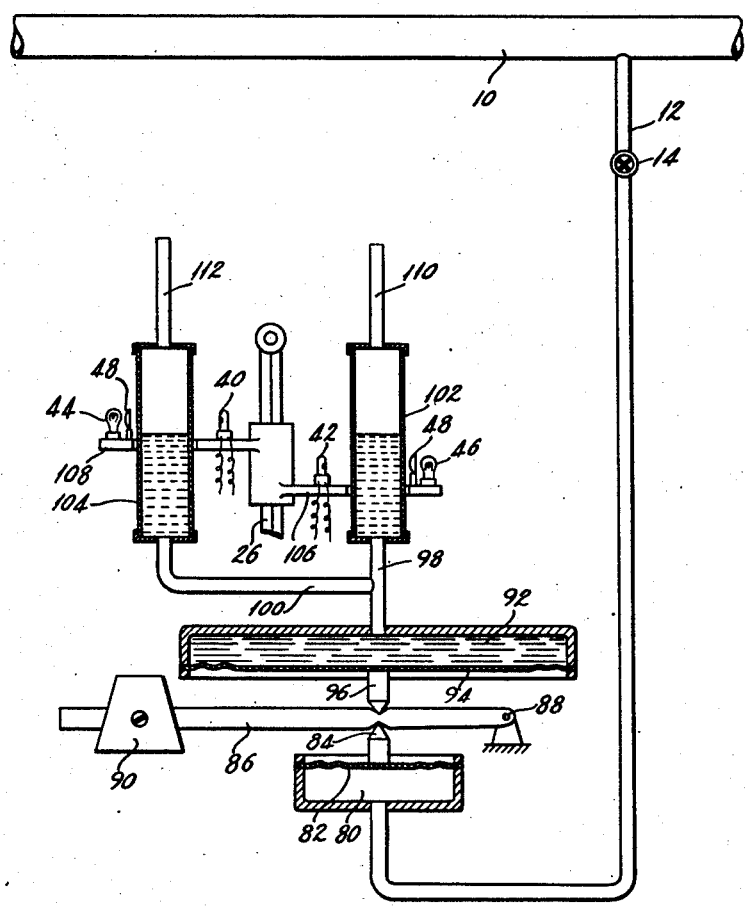
Fig. 2 is a diagrammatic view of my invention embodied in an apparatus wherein the pressure is balanced in part by a loaded diaphragm.

In Fig. 2 there is shown an embodiment of my invention in which the major portion of the pressure is balanced by means of a loaded diaphragm, thus eliminating the necessity of a high atmospheric leg, and hence is particularly advantageous for use with high pressures. Referring to the drawing, conduit 12 which is connected to the header 10 and is provided with a shut-off valve 14, as was the case in Fig. 1, communicates with a diaphragm chamber 80, the upper end of which is closed by means of a movable diaphragm 82. This diaphragm carries a knife edge 84 which cooperates with a notch formed in the lever 86 which is pivoted at one end at 88. The other end of the lever carries a preferably movable weight 90, the position of which on the lever arm may be so adjusted that the resulting force applied to the diaphragm 82 through the knife edge 84 is sufficient to balance the major portion of the fluid pressure within the chamber 80.

Mounted above the lever 86 is a diaphragm chamber 92, the lower end of which is closed by movable diaphragm 94 which carries a knife edge 96 which cooperates with a notch in the lever 86. The diaphragm chamber 92 is connected by means of conduits 98 and 100 with gauge glasses 102 and 104, respectively, which are located at the same level. The rod 26, which is moved up and down by the same mechanism as disclosed in Fig. 1, extends between the two gauge glasses. This rod carries a lower horizontal arm 106 which extends around the gauge glass 102, and an upper horizontal arm 108 which extends around the gauge glass 104. The upper arm carries a photo-electric cell 40, a light source 44, and, if desired, a lens system 48, while the lower arm carries the photo-electric cell 42, light source 46 and lens system 48. The upper ends of the gauge glasses may be vented to atmosphere through the conduits 110 and 112.

In operation, pressure from the header 10 is communicated through the conduit 12 to the diaphragm chamber 80 and tends to move the diaphragm 82 upwardly. A major portion of the force resulting from the pressure in the diaphragm is balanced by means of the weighted lever 86, while the remainder of the force is balanced by the head of mercury, or other liquid, in the conduits 98 and 100 and the gauge glasses 102 and 104 which is exerted against the diaphragm 94. In the event the steam pressure increases, the pressure thereof exerted against the diaphragm 82 will be increased and hence will result in the upward pivoting of the arm 86. This in turn raises the diaphragm 94 and displaces mercury from the chamber 92 upwardly into the gauge glasses. Inasmuch as the cross-sectional area of diaphragm chamber 92 is substantially greater than the combined cross-sectional areas of the two gauge glasses, this displacement of mercury will result in an increase in the head which is applied to the diaphragm 94, thus balancing the increased pressure.

At the same time, the rise of mercury level in the glass 104 interrupts the beam of light from the source 44 to the photo-electric cell 40, which actuates a relay which in turn causes a reversible motor, similar to the motor 64 shown in Fig. 1, to rotate in the proper direction to move the arm 26 upwardly. This in turn raises the photo-electric cell and the light source until the beam is above the mercury level, whereupon the motor stops. As was the case in Fig. 1, if the regulation resulting from this upward movement of the rod 26 is sufficient to arrest the increase in the steam pressure, no further regulation takes place. However, if the pressure continues to rise, this raises still further the level of the mercury in the gauge glass with the result that the rod 26 is moved upwardly another step. In the event of a decrease in pressure, the arm 86 moves downwardly, thus permitting the diaphragm 94 to move downwardly so that mercury flows from the gauge glasses into the diaphragm chamber 92. The resulting decrease in level in the gauge glass 102 permits light from the source 46 to strike the photo-electric cell 42, thus causing the motor to operate in the direction to lower the rod 26.

The use of two parallel gauge glasses in this embodiment is merely for the purpose of making it possible to separate the two photo-electric cells further from each other, thus eliminating all possibility of one cell being affected by the light source intended for the other cell. Obviously, the single gauge glass shown in Fig. 1 could be employed in the embodiment illustrated in Fig. 2, while the dual glasses shown in Fig. 2 could be used in any of the other embodiments.

In Fig. 3 a major portion of the pressure is balanced by means of a trapped body of gas, such as air, while fluctuations in pressure are balanced by changes in liquid head. In this embodiment the conduit 12 communicates with the upper end of a gauge glass 16, while the lower end of the glass is connected by means of a conduit 18 with a well 116 formed in the bottom of a pressure vessel 118. This vessel may be charged with air up to the desired pressure by means of an air compressor 120 through a conduit 122 provided with a shut-off valve 124 and a pressure gauge 128.

A pair of photo-electric cells and suitable light sources therefor are associated with the gauge glass 16 in exactly the same manner as shown in Fig. 1, and the photo-electric cells and light sources are raised and lowered by the same mechanism as previously described.

Mercury, or other suitable liquid, is placed in the gauge glass and well so as to stand at about the level indicated, and the vessel 118 is initially charged with air by means of the compressor 120 at the same time that steam pressure is admitted to the gauge by opening the valve 14. The vessel 118 should be charged to about the same pressure as that normally existing in the header 10, and thereafter the valve 124 may be closed. Under these conditions, the mercury does not have to balance any of the steam pressure, and consequently the surface of the mercury in the glass 16 and in the well 116 will stand at about the same level.

An increase in pressure will depress the level in the glass and raise it in the well until the difference in liquid head balances the increase in pressure. The chamber 118 is made with sufficient volume so that the increase in pressure therein resulting from the decrease in air volume caused by the increase in level in the well 116 will be negligible. Consequently, the variation in liquid level in the gauge will be proportionate to the variation in steam pressure, and this change in level may be employed to operate the reversible motor by means of the photo-electric cells in exactly the same manner as described in connection with Fig. 1.

In Fig. 4 the major portion of the steam pressure is balanced by means of a weighted bellows, so that again the mercury head need be sufficient only to balance variations in pressure. In this embodiment the conduit 12 connects the header 10 with a pressure vessel 130 in which is located a collapsible bellows 132. The lower end of this bellows is fixed to the bottom of the vessel 130, while the upper end is pivotally connected by means of a link 134 with a lever 135 which is pivoted at 138. This lever carries a weight 140, the lever and weight preferably being located within the vessel 130 in order to avoid the necessity of stuffing boxes.

The interior of the bellows 132 is connected by means of a conduit 142 with the lower end of the gauge glass 16, the upper end of which may be vented to atmosphere through the conduit 144. The bellows is filled with mercury or other suitable liquid, which also fills the conduit 142 and the glass 16 up to about the level shown. When the steam is admitted to the vessel 130 through the conduit 12, the pressure thereof is exerted against the exterior of the bellows, thus tending to collapse the latter. This is resisted by the weighted arm 136, which tends to expand the bellows, the weight and its position on the lever arm being so chosen as to balance the normal pressure of the steam. Should the steam pressure increase, it collapses the bellows 132, thus forcing mercury therefrom into the gauge glass 16, which raises the level in the glass. This increases the head of the mercury which acts to prevent collapse of the bellows, thus balancing the increase in steam pressure. The variation in liquid level in the gauge glass 16 may be utilized to control the light sources for a pair of photo-electric cells in the same manner as described in the previous embodiments.

Figure 5:
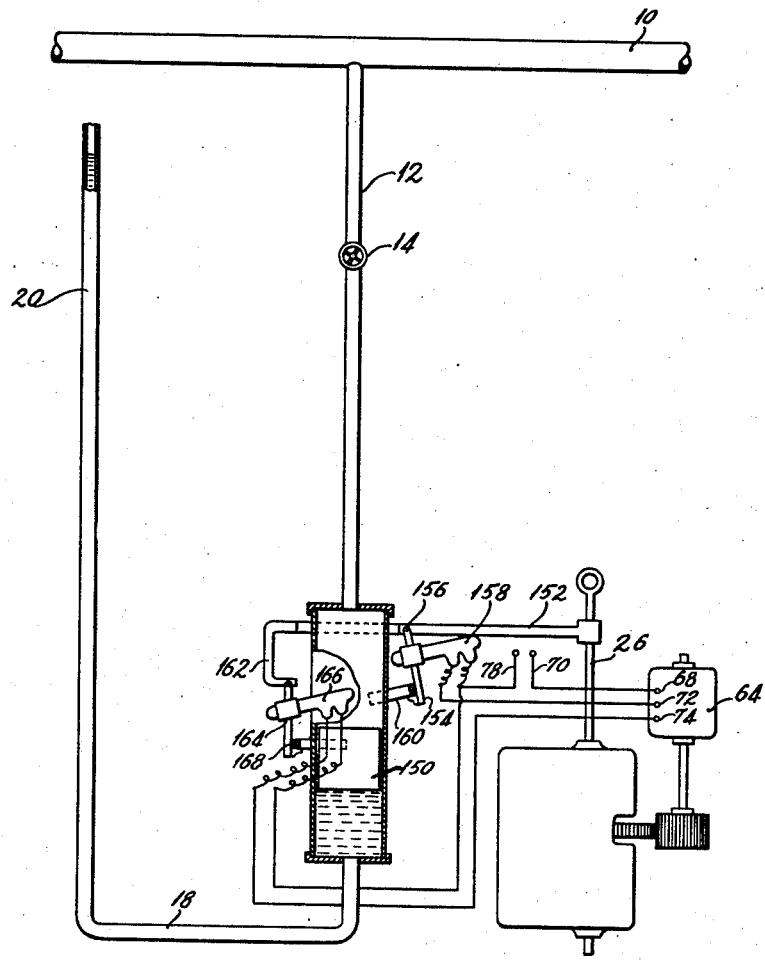
Fig. 5 is a more or less diagrammatic view of an embodiment involving switching means responsive to variations in magnetic flux.

In Fig. 5 is shown an embodiment employing magnetically actuated switching means. The header 10 is connected through a conduit 12 with the upper end of a chamber 16, the lower end of which is connected to a conduit 18 having an atmospheric leg 20, as was the case in Fig. 1. Disposed within the chamber 16 is a magnet 150 constructed so as to float on the mercury or other liquid therein.

The rod 26 which is arranged to be moved vertically by the reversible motor 64 acting through gearing similar to that shown in Fig. 1, carries an arm 152. A bracket 154 is pivoted at 156 on this arm and carries a mercury switch 158. As is well known, tilting of a switch of this type to an angle as shown with respect to the horizontal interrupts the circuit therethrough, while swinging it to a more nearly horizontal position, as by clockwise rotation of the bracket 154, completes the circuit through the switch. Secured to the lower end of bracket 154 is an arcuate member 160 made of magnetic material which, when the bracket is pivoted in a clockwise direction to a substantial vertical position embraces the chamber 16.

Arm 152 is extended to the opposite side of the chamber 16 and is formed with a downwardly extending portion 162 to which is pivoted a bracket 164. Secured to this bracket is a mercury switch 166. As is shown in Fig. 5, when the bracket 164 is substantially vertical the switch 166 is tilted to an angle which causes the mercury contained therein to interrupt the circuit through the switch. Secured to the lower end of the bracket 164 is an arcuate magnetic member 168 which is similar to member 160.

The reversible motor 64 is supplied with electric current through the lead 70 and 78. One branch of the lead 78 is connected through the mercury switch 158 to the terminal 72 of the motor, while the other branch of this lead is connected through the switch 166 to the terminal 74. Obviously relay circuits, such as shown in Fig. 1, could be employed, if it is not desired to connect the power circuit through the mercury switches. However, relays are not necessary because switches of this nature are capable of carrying sufficiently heavy current to operate the motor.

The above described embodiment operates as follows. Pressure existing in the main 10 is communicated through the conduit 12 to the chamber 16, and this pressure is balanced by the column of mercury in the atmospheric leg 20. As previously described, the magnet 150 floats in the mercury in the chamber 16, and consequently is moved up and down as the level therein changes in response to variations of pressure. With the parts in the position shown in Fig. 5, the magnet 150 is below the magnetic member 160 on the bracket 154 and consequently the bracket occupies the position shown, that is swung out from the chamber 16. This maintains the switch 158 in the tilted position so that the circuit therethrough is open. On the other hand, the magnet 150 is opposite the magnetic member 168 on the bracket 164, and consequently the member 168 is attracted towards the chamber 16 so as to maintain the bracket 164 substantially vertical and hence the switch 166 is maintained in the tilted position in which the circuit therethrough is open. Consequently, no current is supplied to the motor 64 and the system is idle.

Assuming the pressure in the main 10 to decrease, the liquid level in the chamber 16 rises and consequently the magnet 150 is moved upwardly. When it comes opposite the magnetic member 160, the latter is attracted thereby so as to pivot the bracket 154 to a substantial vertical position, thus tilting the mercury switch 158 to a substantial horizontal position in which the circuit therethrough is completed. At the same time the lower part of the magnet 150 is still opposite the magnetic member 168, and the latter thus remains attracted by the magnet 150 and hence no change takes place in the circuit through the switch 166. The closing of the switch 158 supplies the motor 64 with current through the terminals 68 and 72, thus causing the motor to operate in the proper direction to raise the rod 26. Inasmuch as the arm 152 is secured to this rod, the brackets 154 and 164 are likewise raised until the magnetic member 160 is lifted above the top of the magnet 150. Thereupon, the bracket 154 swings away from the chamber 16 so as to tilt the switch 158 to open position, and the motor is stopped. As described in connection with the previous embodiments, if this amount of movement of the rod 26 does not provide sufficient regulation to arrest the decrease in pressure, the magnet 150 is raised further so as to again close the switch 158, thus repeating the operation. In this way step-by-step regulation is obtained which minimizes hunting.

If the pressure in the main 10 increases, the liquid level and hence the magnet 150 falls until the latter is below the magnet member 168. Consequently, the bracket 164 pivots in a clockwise direction, thus turning the switch 166 to a substantially horizontal position in which the circuit therethrough is completed. This supplies current to the motor 64 through the terminals 68 and 74, causing the motor to operate in the opposite direction so as to move the rod 26 downwardly. When the magnetic member 168 is moved down to a position opposite the magnet 150 the switch 166 is again closed and, if necessary, the operation is repeated in the same manner as described in connection with a decrease in pressure.

Obviously, the magnetic switch means shown in Fig. 5 could be used with any of the arrangements illustrated in Figs. 2 through 4 for reducing the height of the atmospheric leg.

While I have shown and described several more or less specific embodiments of my invention, it is to be understood that this has been done for purposes of illustration only and that the scope of my invention is not to be limited thereby but is to be determined from the appended claims.

What is claimed:

1. In an automatic device operative by variations in fluid pressure, a first diaphragm, means for applying said pressure to said diaphragm, a weight acting on said diaphragm to balance a constant part of said pressure, a second diaphragm, a diaphragm chamber therefor, means for transferring movement of said first diaphragm resulting from variations of said pressure to said second diaphragm, hollow means containing liquid connected to and extending above said diaphragm chamber, the cross-sectional area of said hollow means being less than that of said second diaphragm, a pair of electric switching means spaced vertically outside said hollow means and responsive to variations in the transmission of energy through said hollow means, means responsive to an increase in the level of the liquid in said hollow means for varying the transmission of energy to the upper of said switching means and responsive to a decrease in said level for varying the transmission of energy to the lower of said switching means, a reversible electric motor connected to be operated in one direction under the control of one of said switching means and in the opposite direction under the control of the other switching means, and means driven by said motor for moving said switching means relative to said hollow means in the same direction as the direction of movement of the liquid level which resulted in the operation of the motor.

2. In an automatic device operative by variations in fluid pressure, a first diaphragm, means for applying said pressure to one side of said diaphragm, a pivotally mounted generally horizontal weighted lever, means for applying force from said lever to the other side of said diaphragm, a second diaphragm, a diaphragm chamber therefor, mechanical means for transferring movement of said first diaphragm to said second diaphragm, hollow means containing liquid connected to and extending above said chamber, the cross-sectional area of said chamber being greater than that of said hollow means, a pair of electric switching means spaced vertically outside said hollow means and responsive to variations in the transmission of energy through said hollow means, means responsive to an increase in the level of the liquid in said hollow means for varying the transmission of energy to the upper of said switching means and responsive to a decrease in said level for varying the transmission of energy to the lower of said switching means, a reversible electric motor connected to be operated in one direction under the control of one of said switching means and in the opposite direction under the control of the other switching means, and means driven by said motor for moving said switching means relative to said hollow means in the same direction as the direction of movement of the liquid which resulted in the operation of the motor.

GERALD S. CARRICK.

REFERENCES CITED

The following references are of record in the file of this patent:

UNITED STATES PATENTS

| Number | Name | Date |
|---|---|---|
| 1,981,354 | Goerg | Nov. 20, 1934 |
| 2,091,303 | Brelsford | Aug. 31, 1937 |
| 2,376,459 | Stevens | May 22, 1945 |

OTHER REFERENCES

"Electronics" Magazine, April 1944, pages 230, 232 and 234 article entitled "Photo tube for Biological Recording."